(12) United States Patent
Nichols et al.

(10) Patent No.: US 6,184,268 B1
(45) Date of Patent: *Feb. 6, 2001

(54) INK JET INK COMPOSITIONS AND PROCESSES THEREOF

(75) Inventors: Garland J. Nichols, Ontario; Chieh-Min Cheng, Rochester; Min-Hong Fu, Webster, all of NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/385,207

(22) Filed: Aug. 30, 1999

(51) Int. Cl.[7] .................. C09D 11/10; C08L 33/08; C08L 33/10; C08L 33/02; C08F 220/06; C08F 220/10; C08F 220/02

(52) U.S. Cl. .................. 523/160; 524/556; 526/319; 526/317.1

(58) Field of Search .................. 523/160, 161; 106/31.27, 31.28, 31.6, 31.59, 31.89; 524/505, 556, 845, 802; 526/317.1, 319, 323.2

(56) References Cited

U.S. PATENT DOCUMENTS

| | | | |
|---|---|---|---|
| 4,463,359 | 7/1984 | Ayata et al. | 346/1.1 |
| 4,840,674 | 6/1989 | Schwarz | 106/22 |
| 4,853,036 | 8/1989 | Koike et al. | 106/20 |
| 5,021,802 | 6/1991 | Allred | 346/1.1 |
| 5,041,161 | 8/1991 | Cooke et al. | 106/22 |
| 5,043,084 | 8/1991 | Gutierrez et al. | 252/47 |
| 5,065,167 | 11/1991 | You et al. | 346/1.1 |
| 5,124,718 | 6/1992 | Koike et al. | 346/1.1 |
| 5,207,825 | 5/1993 | Schwarz, Jr. | 106/22 R |
| 5,207,954 * | 5/1993 | Lewis et al. | 264/13 |
| 5,223,026 | 6/1993 | Schwarz, Jr. | 106/20 D |
| 5,258,064 * | 11/1993 | Colt | 106/31.43 |
| 5,278,020 | 1/1994 | Grushkin et al. | 430/137 |
| 5,290,654 | 3/1994 | Sacripante et al. | 430/137 |
| 5,308,734 | 5/1994 | Sacripante et al. | 430/137 |
| 5,461,125 * | 10/1995 | Lu et al. | 525/293 |
| 5,712,339 * | 1/1998 | Guerin et al. | 524/515 |
| 5,734,403 * | 3/1998 | Suga et al. | 347/101 |
| 5,750,594 * | 5/1998 | Page et al. | 523/161 |
| 5,760,124 * | 6/1998 | Listigovers et la. | 524/505 |
| 5,762,695 | 6/1998 | Wong et al. | 106/31.89 |
| 5,814,685 * | 9/1998 | Satake et al. | 523/201 |
| 5,837,043 | 11/1998 | Wong et al. | 106/31.89 |
| 5,847,026 * | 12/1998 | Kitahara et al. | 523/161 |
| 5,936,008 * | 8/1999 | Jones et al. | 523/161 |
| 5,938,827 | 8/1999 | Breton et al. | 106/31.43 |
| 5,977,210 * | 11/1999 | Patel et al. | 523/161 |
| 5,981,651 * | 11/1999 | Patel et al. | 524/773 |
| 6,022,403 * | 2/2000 | Kuo | 106/31.86 |
| 6,039,793 * | 3/2000 | Gundlach et al. | 106/31.28 |

* cited by examiner

*Primary Examiner*—Vasu Jagannathan
*Assistant Examiner*—Callie E. Shosho
(74) *Attorney, Agent, or Firm*—E. D. Palazzo

(57) ABSTRACT

A process for the preparation of an ink comprised of an organic solvent, a colorant and a latex, and wherein the latex is generated from the polymerization of a mixture of an anionic surfactant, a nonionic surfactant, and a mixture of olefinic monomers, followed by the addition of an organic solvent.

52 Claims, No Drawings

INK JET INK COMPOSITIONS AND PROCESSES THEREOF

Disclosed in U.S. Pat. No. 5,837,043 and U.S. Pat. No. 5,762,695, the disclosures of each application being totally incorporated herein by reference in their entirety, are inks with certain surfactants. More specifically, in U.S. Pat. No. 5,762,695, there is disclosed an ink jet ink and imaging process which comprises the development of an image with an aqueous ink jet ink composition comprised of, for example, colorant, water, and resin.

The following applications, the disclosures of each being totally incorporated herein by reference, relate to ink compositions and processes thereof:

U.S. Ser. No. 09/385,908 and U.S. Ser. No. 09/385,909, being filed concurrently herewith;

U.S. Pat. No. 5,973,026 relating to an aqueous ink containing a dissipatable polymer, colorant and a zwitterionic component like betaine;

U.S. Pat. No. 5,977,209 relating to an ink containing a colorant, polymer, such as a dissipatible polymer, vehicle, and a salt of polyacrylic, a salt of polyamic acid, a salt of alginic acid, or mixtures thereof;

U.S. Pat. No. 5,969,003 relating to an ink containing a resin of a dissipatible sulfonated polyester terminated with acrylic or methacrylic acid groups; and U.S. Pat. No. 5,938,827 relating to an ink containing a mixture of two black colorants, betaine, and N,N'-bis(3-aminopropyl) ethylenediamine.

Emulsion/aggregation/coalescence processes for the preparation of dry toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935.

The appropriate components and processes of the above applications and patents may be selected for the present invention in embodiments thereof.

BACKGROUND OF THE INVENTION

The present invention is generally directed to ink compositions, and processes thereof, and more specifically, the present invention is directed to processes for the preparation of colored aqueous, or water containing ink compositions particularly suitable for use in ink jet printing processes, and especially thermal ink jet processes, and other similar processes, and wherein there is permitted minimal or no kogation, inks with suitable particle sizes, minimal intercolor bleed for the images developed, and wherein paper curl is minimized and image smearing is minimal, or avoided. The inks in embodiments of the present invention are comprised of an ink vehicle, colorant, and additives, and wherein the inks exhibit no or minimal kogation or heater deposits when used with a high glass transition resin that is designed to complement the colorant. Prevention of heater deposits/kogation enables for example, superior ink jetting performance and enhanced life in the printhead, and excellent thermal stability of the ink, for example the ink usually will not decompose or settle for extended time periods of up to about one year.

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and in the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble, which expels an ink droplet. As the bubble grows, the ink rapidly bulges from the nozzle and is momentarily contained by the surface tension of the ink as a meniscus. As the bubble begins to collapse, the ink remaining in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084, the disclosures of which are totally incorporated herein by reference.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some systems, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important consideration for ink jet ink can be the ability of the ink to be stable with minimal or no settling, the ability of the ink to remain in a fluid condition in a printhead opening on exposure to air, and moreover wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, is capable of firing a drop of ink at its intended target. Latency is the maximum idling times allowed for ink to be jetted by a printer with a speed equal to or greater than 5 m/s (equivalent to an ink traveling a distance of 0.5 millimeter in less than 100 μs) without a failure. This measurement can be accomplished with the printhead or nozzles uncovered or decapped and generally at a relative humidity of about 15 percent. The time interval is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, another important consideration for ink jet inks, especially for pigment, such as carbon black, based inks, is for the pigment dispersion to remain stable throughout the life of the ink jet cartridge. Dye-based ink jet inks suffer from deficiencies in waterfastness and lightfastness after being printed on various substrates. Pigments provide an image on a wide variety of substrates, having high optical density with high waterfastness and lightfastness. Therefore, pigments are a preferred alternative to dyes, provided the pigment dispersions can be made stable to prevent flocculation and/or aggregation and settling. Some cosolvents that can be selected as clogging inhibitors cause destabilization of pigment dispersions and, therefore, are not usually effective in pigmented inks.

There is thus a need for aqueous ink compositions and processes thereof that can be utilized in high resolution ink jet printers. Additionally, there is a need for colored, especially pigmented inks that provide high latency and also remain stable throughout the life of the ink jet cartridge. There is also a need for pigmented inks that provide high optical density in a single pass. More importantly, there is a need for ink jet inks wherein paper curl, and/or image smearing can be eliminated or minimized when such inks are selected for ink jet printing processes, and wherein the images possess minimal, or acceptable intercolor bleed, that is for example, wherein color overlap, or diffusing of one color into another is minimal, or avoided; and wherein excellent waterfast and lightfast images can be generated.

SUMMARY OF THE INVENTION

Aspects of the present invention relate to a process for the preparation of an ink comprised of a colorant and a latex, and wherein the latex is generated from the polymerization of a mixture of an anionic surfactant, a nonionic surfactant, and a mixture of olefinic monomers, followed by the addition of an organic solvent; a process wherein the mixture of monomers is comprised of two monomers; a process wherein the mixture of monomers is comprised of two monomers of a first monomer and a second monomer, and wherein the first monomer possesses a glass transition temperature of equal to about, or higher than about 70° C.; a process wherein the mixture of monomers is comprised of two monomers of a first monomer and a second monomer, and wherein the first monomer optionally possesses a glass transition temperature of about 90° C. to about 120° C.; a process wherein the mixture of monomers is comprised of two monomers of a first monomer and a second monomer, and wherein the first monomer is a homopolymer that optionally possesses a glass transition temperature of about 100° C. to about 110° C.; a process wherein the mixture of monomers is comprised of two monomers of a first monomer and a second monomer, and wherein the second monomer possesses a glass transition temperature of equal to about, or lower than about 20° C.; a process wherein the mixture of monomers is comprised of two monomers of a first monomer and a second monomer, and wherein the second monomer possesses a glass transition temperature of from about 0° C. to about minus (−) 60° C.; a process wherein the mixture of monomers is comprised of two monomers of a first monomer and a second monomer, and wherein the second monomer possesses a glass transition temperature of from about a minus (−) 10° C. to about −30° C.; a process wherein the mixture of monomers is comprised of two monomers of a first monomer and a second monomer, and wherein the second monomer is a homopolymer that possesses a glass transition temperature of from about 0° C. to about −60° C.; a process wherein the mixture of monomers is comprised of two monomers of a first monomer and a second monomer, and wherein the first monomer possesses a higher glass transition temperature than the second monomer; a process wherein the mixture of monomers is comprised of two monomers of a first monomer and a second monomer, and wherein the first monomer possesses a higher glass transition temperature than the second monomer, and wherein each of the first and the second monomer is a homopolymer; a process wherein the mixture of monomers is comprised of two monomers of a first monomer and a second monomer, and wherein the first monomer possesses a higher glass transition temperature than the second monomer, and wherein the amount of the first monomer selected is from about 60 to about 98 weight percent and wherein the total of the two monomers is about 100 percent; a process wherein the mixture of monomers is comprised of two monomers of a first monomer and a second monomer, and wherein the first monomer possesses a higher glass transition temperature than the second monomer, and wherein the amount of the first monomer selected is from about 70 to about 95 weight percent and wherein the total of the two monomers is about 100 percent; a process wherein the mixture of monomers is comprised of two monomers of a first monomer and a second monomer, and wherein the first monomer possesses a higher glass transition temperature than the second monomer, and wherein the amount of the second monomer selected is from about 2 to about 40 weight percent and wherein the total of the two monomers is about 100 percent; a process wherein the mixture of monomers is comprised of two monomers of a first monomer and a second monomer, and wherein the first monomer possesses a higher glass transition temperature than the second monomer, and wherein the amount of the second monomer selected is from about 5 to about 30 weight percent and wherein the total of the two monomers is about 100 percent; a process wherein the mixture of monomers is comprised of two monomers of a first monomer and a second monomer, and wherein the first monomer possesses a higher glass transition temperature than the second monomer, and wherein the amount of the first monomer selected is from about 60 to about 98 weight percent, the amount of the second monomer is from about 2 to about 40 weight percent and wherein the total of the two monomers is about 100 percent; a process wherein the first monomer possesses a glass transition temperature of from about 90° C. to about 120° C.; a process wherein the second monomer possesses a glass transition temperature of from about 2° C. to about 40° C.; a process wherein the first monomer possesses a glass transition temperature of from about 90° C. to about 120° C., and wherein the second monomer possesses a glass transition temperature of from about 2° C. to about 40° C; a process wherein the mixture of monomers is comprised of two monomers of a first monomer and a second monomer, and wherein the first monomer possesses a higher glass transition temperature than the second monomer, and wherein the first monomer possesses a glass transition temperature of from 90° C. to about 120° C., the second monomer possesses a glass transition temperature of form about 0° C. to about −60° C., and wherein the first monomer is selected in an amount of from about 60 to about 98 percent by weight, and the second monomer is present in an amount of from about 2 to about 40 percent by weight and wherein the total amount of the first and the second monomer is about 100 percent; a process wherein the mixing of colorant and latex provides a homogeneous mixture; a process wherein the colorant is a colorant dispersion comprised of a colorant and a dispersant or a self-dispersing colorant; a process wherein the mixture is comprised of a first monomer and a second monomer, and wherein the first monomer is selected from a group consisting of methyl methacrylate, cyclohexyl methacrylate, phenyl methacrylate, isobornyl methacrylate, acrylic acid, methacrylic acid, and styrene; a process wherein the mixture is comprised of a first monomer and a second monomer, and wherein the second monomer is selected from a group consisting ethyl acrylate, butyl acrylate, hexyl acrylate, polyoxyethylene acrylate and methacrylate; a process wherein the monomers selected enable a high glass transition temperature polymer; a process wherein the polymer glass transition temperature is from about 45° C to about 120° C.; a process wherein the polymer glass transition temperature is from about 50° C. to about 100° C.; process wherein the colorant is a dye; a process wherein the colorant is a pigment; a process wherein the colorant possesses a particle size distribution wherein at least about 90 percent of the colorant particles have a diameter of about 0.1 μm with the remaining colorant particles being of a diameter of about 1 μm; a process wherein the latex contains water; a process wherein the amount of monomer selected is from about 90 to about 99, the amount of anionic surfactant is from about 0.1 to about 10, and the amount of nonionic surfactant is from about 0.1 to about 6 weight percent based on the total weight percent amount of optional organic solvent monomer, ionic surfactant, and nonionic surfactant; a process wherein there is obtained an ink and there is added to the ink an ink vehicle and ink additives; a process wherein the vehicle is water, a glycol, or a mixture of glycols; a process wherein the additives are surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which surfactants are present in an amount of from about 0.01 to about 7 weight percent or parts based on the total amount of ink components; a process wherein the ink additives are comprised of a biocide, a humectant, or mixtures thereof; a high resolution printing process comprising applying in imagewise fashion to a substrate an ink composition obtained by the processes illustrated herein; an ink process wherein the substrate is paper, and there is selected a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a process wherein subsequent to polymerization of monomer, especially olefinic monomers, there is formed a polymer selected from the group consisting of poly(methyl methacrylate-butyl acrylate), poly(phenyl methacrylate-butyl acrylate), poly(styrene-butyl acrylate), poly(styrene-polyethyleneglycol methacrylate), poly(phenyl methacrylate-polyethylene glycol methacrylate), poly(methyl methacrylate-butyl acrylate-acrylic acid), poly(methyl methacrylate-hexyl acrylate-acrylic acid), poly(cyclohexyl methacrylate-butyl acrylate-acrylic acid), poly(styrene-butyl acrylate-acrylic acid), poly(styrene-polyethyleneglycol methacrylate-acrylic acid), poly(phenyl methacrylate-polyethyleneglycol methacrylate-acrylic acid), poly(methyl methacrylate-butyl acrylate-methacrylic acid), poly(methyl methacrylate-hexyl acrylate-methacrylic acid), poly(phenyl methacrylate-butyl acrylate-methacrylic acid), poly(cyclohexyl methacrylate-butyl acrylate-methacrylic acid), poly(isobornyl methacrylate-butyl acrylate-methacrylic acid), poly(styrene-butyl acrylate-methacrylic acid), poly(styrene-polyethyleneglycol methacrylate-methacrylic acid), and poly(phenyl methacrylate-polyethylene glycol methacrylate-methacrylic acid), and preferably poly(methyl methacrylate-butylacrylate-acrylic acid), poly(styrene-butyl acrylate-methacrylic acid), and poly(phenyl methacrylate-polyethyleneglycol methacrylate-acrylic acid); a process wherein the organic solvent is a glycol, a diol, a sulfoxide, an amide, an ether, an alcohol, a ketone, or an amino alcohol; a process wherein the organic solvent is sulfolane, diethylene glycol, 2-pyrrolidinone, N-methyl pyrrolidinone, butyl carbitol, formamide, glycerin, or mixtures thereof; a process wherein the organic solvent is selected in an amount of from about 5 to about 50 weight percent; a process wherein the organic solvent primarily functions as a humectant; a process wherein the polymerization is accomplished by heating at a temperature of from about 45° C. to about 90° C.; a process wherein there is generated a polymer of poly(methylmethacrylate-butylacrylate-acrylic acid), poly(styrene-butyl acrylate-methacrylic acid), and poly(phenyl methacrylate-polyethyleneglycol methacrylate-acrylic acid); a process wherein there is generated a polymer of the latex polymer which possesses a number average molecular weight $M_n$ of from about 1,000 to about 1,000,000, and preferably from about 3,000 to about 500,000 grams per mole, a weight average molecular weight $M_w$ of from about 5,000 to about 2,000,000, and preferably from about 8,000 to about 1,500,000 grams per mole; a process wherein the anionic surfactant is sodium dodecyl sulfate, sodium dodecylbenzene sulfonate, sodium dodecyl naphthalene sulfate, sodium dodecyl diphenyloxide disulfonate, or sodium N-decyl diphenyloxide disulfonate, wherein the anionic surfactant is selected in an amount of from about 0.1 to about 10 weight percent based on the total weight percent amount of monomer, ionic surfactant, and nonionic surfactant used to prepare the latex emulsion; a process wherein the anionic surfactant is polyvinyl alcohol, polyacrylic acid, methyl cellulose, polyoxyethylene octylphenyl ether, or polyoxyethylene nonylphenyl ether, wherein the anionic surfactant is selected in an amount of from about 0.1 to about 6 weight percent based on the total weight percent amount of monomer, anionic surfactant, and nonionic surfactant used to prepare the latex emulsion; a process for the preparation of an ink which comprises mixing a colorant and a latex, and wherein the latex is generated from the polymerization of a mixture of an anionic surfactant, a nonionic surfactant, and a mixture of olefinic monomers; a process wherein the mixture of olefinic monomers is comprised of two monomers, and subsequent to polymerization there is added an organic solvent; a process wherein the mixture is comprised of a first monomer with a high glass transition temperature and a second monomer comprised of a low glass transition temperature monomer, and subsequent to polymerization there is added an organic solvent; a process wherein the organic solvent is sulfolane, 2-pyrrolidinone, ethylene glycol, diethylene glycol, dipropylene glycol-monomethyl ether, N-pyrrolidinone, or mixtures thereof; a process which comprises contacting colorant and latex, and wherein the latex is generated from the polymerization of an olefin monomer, an anionic surfactant, and a nonionic surfactant, and subsequent to polymerization there is added an organic solvent; a process wherein the monomer is comprised of a mixture of monomers; ink compositions comprised of colorant, polymer, and certain additives; inks comprised of a major amount of a vehicle, like water, colorant, such as dye, pigment, or mixtures thereof, polymer, and known ink additives, such as biocides, humectants, polymeric additives, stabilizer additives, and the like. The inks in embodiments possess a latency of, for example, at least about 20 seconds in a printer having at least one nozzle of a channel width or diameter ranging for example, from about 10 to about 40 microns, and wherein intercolor bleed is minimized or eliminated.

The inks of the present invention can be prepared by, for example, mixing at least one solvent, water, for example, in an amount of about 40 percent and colorant. Upon mixing, a resin or polymeric additive is added to the ink mixture and stirred. The final ink mixture can then be filtered through, for example, a 1 μm glass fiber filter to primarily remove any larger particles greater than about 1 μm.

The latex polymer can be prepared by a free radical-initiated aqueous emulsion polymerization of a mixture of olefinic monomers, free radical initiator, chain transfer agents, surfactants, and water, wherein the monomers selected is selected in an amount of from about 1 to about 40 weight percent, and the water used is selected in an amount of from about 59 to about 98 weight percent, based on the total reaction mixture components. Preferably, the free radical is selected in amounts of, for example, from about 0.1 to about 10 weight percent based on the total monomer or monomers used to prepare the polymer resin. Chain transfer agents can be selected in amounts of, for example, from about 0 to about 10 weight percent based on the total monomer or monomers used to prepare the polymer resin. Surfactants are selected in amounts of from about 0.1 to about 10 weight percent based on the total monomer or monomers used to prepare the polymer resin. The monomer can be polymerized by heating at, for example, temperatures of between about 45° C. to about 90° C., wherein the resulting latex polymer possesses, for example, a number average molecular weight of from about 1,000 grams per mole to about 1,000,000 grams per mole, and a weight average molecular weight of from about 5,000 grams per mole to about 2,000,000 grams per mole, and a glass temperature of from about 45° C. to about 120° C. The latex polymer emulsion is preferably comprised of from about 1 to about 40 weight percent of polymer particles, of average diameter of from about 50 nanometers to 25 about 500 nanometers, as measured by light scattering technique on a Coulter N4 Plus Particle Sizer.

The mixture of olefinic monomers selected to prepare the polymer or polymers is preferably comprised of two groups of monomers. One group of monomers is homopolymers which generally possess a glass transition temperatures (Tg) of, for example, higher about 70° C., and preferably of from about 90° C. to about 120° C. The second group of monomers generally possess a Tg of, for example, lower than about 20° C., and preferably from about minus (–)60° C. to about 0° C. Generally, the amount of high Tg monomer utilized is from about 60 to about 98, and preferably from about 70 to about 95 weight percent, and wherein the amount of low Tg monomer utilized is from about 2 to about 40, and preferably from about 5 to about 30 weight percent, based on the total monomers used to prepare the polymer resin. The resulting latex polymer possesses a Tg of, for example, from about 45° C. to about 120° C., and preferably of from about 50° C. to about 100° C.

Examples of high Tg monomers which are suitable for preparation of the latex polymers include acrylates or methacrylates such as methyl methacrylate, isopropyl methacrylate, t-butyl methacrylate, cyclohexyl methacrylate, phenyl methacrylate, isobornyl methacrylate, and isobornyl acrylate; olefinic acid monomers such as acrylic acid, methacrylic acid, sodium acrylate, and potassium acrylate; styrene functional monomers such as styrene, a-methyl styrene, 3-chlorostyrene, 2,5-dichlorostyrene, 4-bromostyrene, 4-tert-butylstyrene, 4-methoxystyrene, vinyl naphthalene, vinyl toluene, and divinyl benzene. Particularly preferred high Tg monomers, are for example, methyl methacrylate, cyclohexyl methacrylate, phenyl methacrylate, isobornyl methacrylate, acrylic acid, methacrylic acid, and styrene. Preferably from 1 to about 5 high Tg monomer mixtures are selected.

Low Tg monomer examples which are suitable for preparation of the latex polymers are homopolymers of methacrylates with aromatic or cyclic structures with Tgs higher than about 100° C. Specific examples of low Tg monomers are acrylates or methacrylates such as methyl acrylate, ethyl acrylate, propyl acrylate, butyl acrylate, hexyl acrylate, pentyl acrylate, heptyl acrylate, octyl acrylate, 2-ethylhexyl acrylate nonyl acrylate, decyl acrylate, lauryl acrylate, stearyl acrylate, dodecyl acrylate, butyl methacrylate, hexyl methacrylate, pentyl acrylate, pentyl methacrylate, heptyl acrylate, heptyl methacrylate, octyl methacrylate, 2-ethylhexyl methacrylate, nonyl methacrylate, decyl methacrylate, lauryl methacrylate, stearyl methacrylate, and dodecyl methacrylate; and polyoxyalkylene acrylate or methacrylate of the formula

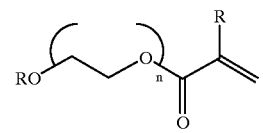

wherein R is hydrogen, or alkyl with from about 1 to about 6 carbon atoms, and n is a number of from about 2 to about 100. Particularly preferred low Tg monomers are, for example, ethyl acrylate, butyl acrylate, hexyl acrylate, and polyoxyethylene acrylate or methacrylate, and preferably from 1 to about 5 low Tg monomers are selected.

The latex polymer can be generated as indicated herein, by free radical-initiated aqueous emulsion polymerization of a mixture of olefinic acidic monomers at temperatures between about 45° C. to about 90° C. The free radical initiator utilized is generally an emulsion type recite here the amounts used initiator, such as a persulfate like potassium or ammonium persulfate, about 0.1 to about 10 percent on weight, based on the monomer, or monomers used to prepare the polymer resin. Chain transfer agents are utilized to adjust the molecular weight of the resin. Chain transfer agents selected include alkylthiol such as dodecanethiol, about 0 to about 10 percent on weight, halogenated carbons such as carbon tetrabromide, about 0 to about 10 percent on weight, based on the monomer, or monomers used to prepare the polymer resin, or preferably a combination of alkylthiol and halogenated carbon. Surfactants, selected primarily to impart colloidal stability to the polymer latex particles, can also be incorporated into the resin emulsion such as anionic, cationic and nonionic surfactants, wherein the effective amount of anionic surfactant is from about 0.1 to about 10 percent on weight, the effective amount of nonionic surfactant is from about 0.1 to about 6 percent, the effective amount of cationic surfactant is from about 0.1 to about 5 percent on weight on weight based on the monomer, or monomers used to prepare the latex polymer resin.

In one specific embodiment the resin emulsion can be prepared by charging a half liter kettle equipped with a mechanical stirrer with from about 300 to about 320 grams of water, 1.0 to about 3.0 grams of sodium dodecylbenzene sulfonate, available from Aldrich, and from about 1.5 to about 2.5 grams of Triton X-100 (alkylphenoxypolyethanol) available is from Union Carbide. This mixture is then stirred for about 0.5 hour at about 100 to about 200 revolutions per minute. To this solution is then added about 1.5 to about 2.5 grams of ammonium persulfate, followed by the addition of an organic mixture containing from about 1 to about 8 grams of butyl acrylate, 60 to about 75 grams of methyl methacrylate, 4 to about 15 grams of acrylic acid, about 0 to about 6 grams of dodecanethiol, and from about 0 to about 5 grams of carbon tetrabromide. The mixture is then heated to about 70° C. to 80° C. (Centigrade) for a duration of, for example, from about 3 to about 16 hours. The product was then cooled to room temperature, and a sample (about 10 grams) is freeze dried and analyzed by GPC, indicating for the polymer or resin product a number average molecular of about 3,000 to about 1,000,000, a weight average molecular weight of about 5,000 to about 2,000,000 grams per mole and a polydispersity of about 2.0 to about 5; and as analyzed by DSC the product resin glass temperature thereof is, for example, about 55° C. to about 100° C.

Moreover, the invention inks preferably contain penetrants of N-methylpyrrolidinone, sulfoxides, ketones, lactones, esters, alcohols, butyl carbitol, benzyl alcohol, 2-pyrrolidinone, cyclohexylpyrrolidinone, and 1,2-hexanediol, present in an amount of for example, from about 0.01 percent to 30 percent by weight. The penetrants are used primarily to enable absorption of the ink droplets into the media, i.e. paper.

The present invention also relates to a high resolution printing process comprising applying in imagewise fashion to a substrate the invention ink in a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a printing process which comprises incorporating into an acoustic ink jet printer the invention ink with a viscosity of from about 0.7 to about 5 centipoise at a temperature of from about 25° C. to about 50° C., and causing droplets of the ink to be ejected in imagewise pattern onto a substrate; a process which comprises (a) providing a acoustic ink printer having a pool of liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, and which ink possesses a viscosity of from about 0.7 to about 5 centipoise at a temperature of from about 25° C. to about 50° C., and (b) causing droplets of the ink to be ejected onto a recording sheet in an imagewise pattern at a temperature of from about 20° C. to about 50° C.; an imaging process which comprises the development of an image with an aqueous ink jet ink composition comprised of colorant, such as dye or pigment, water, and additives as indicated herein, and wherein images with acceptable, or low intercolor bleed, photo like quality, waterfastness, for example from about 90 to about 99 percent, and minimal curling and minimal smearing are obtained; and a high resolution printing process comprising applying in imagewise fashion to a substrate in a printer having at least one nozzle of a channel width or diameter ranging from about 10 to about 40 microns.

Also, the inks and imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable photo like quality, and low intercolor bleed, on substrates such as paper.

Examples of vehicles selected for the inks include water, glycols, mixtures of glycols, a mixture of water and a miscible organic component, such as a glycol, such as ethylene glycol, propylene glycol, diethylene glycols, glycerine, dipropylene glycols, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 50 to about 99 and preferably about 98.9 percent by weight, based on total amount of components in the ink, and more preferably from about 55 to about 95 percent by weight, and still more preferably from about 60 to about 90 percent by weight, although the amounts may be outside these ranges in embodiments. The total of all ink components is about 100 percent, or 100 parts. Also, there can be selected other vehicles not specifically recited herein, such as trimethylolpropane, 1-5-pentanediol, 1,6-hexanediols, diols, and triols containing 2 to 10 carbons, amides, for example N,N-dialkyl amides, N,N-alkyl phenyl amides, N-methylpyrrolidinine, N-cyclohexylpyrrolidinone, N,N-diethyltoluamide, 2-pyrrolidinone, ethers such as alkyl ether derivatives of alcohol, etherdiols, and ethertriols including butyl carbitol, alkyl polyethylene glycols, and the like, urea, betaine, thioethyleneglycol, trith ioethyleneglycol.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally serves as a humectant and possesses a boiling point higher than that of water (100° C.). The colorant, such as a pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediol, 1,6 hexanediol, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, 2-pyrrolidinone, N-methylpyrrolidinone, N-cyclohexylpyrrolidinone, N,N-diethyltoluamide, and the like, ethers such as alkyl ether derivatives of alcohol, etherdiols, and ether triols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, surfactants, pH buffer, biocides, chelating agents (EDTA, ethylene diamine tetraamine, and the like), and optional additives can also be selected for the inks.

Polymer latex examples, and which polymers are generated from the polymerization of a mixture of a high Tg and a low Tg monomer, include polymers such as, poly(methyl methacrylate-butyl acrylate), poly(methyl methacrylate-hexyl acrylate), poly(phenyl methacrylate-butyl acrylate), poly(cyclohexyl methacrylate-butyl acrylate), poly (isobornyl methacrylate-butyl acrylate), poly(styrene-butyl acrylate), poly(styrene-polyethyleneglycol methacrylate), poly(phenyl methacrylate-polyethyleneglycol methacrylate), poly(methyl methacrylate-butyl acrylate-acrylic acid), poly(methyl methacrylate-hexyl acrylate-acrylic acid), poly(phenyl methacrylate-butyl acrylate-acrylic acid), poly(cyclohexyl methacrylate-butyl acrylate-acrylic acid), poly(isobornyl methacrylate-butyl acrylate-acrylic acid), poly(styrene-butyl acrylate-acrylic acid), poly (styrene-polyethyleneglycol methacrylate-acrylic acid), poly(phenyl methacrylate-polyethyleneglycol methacrylate-acrylic acid), poly(methyl methacrylate-butyl acrylate-methacrylic acid), poly(methyl methacrylate-hexyl acrylate-methacrylic acid), poly(phenyl methacrylate-butyl acrylate-methacrylic acid), poly(cyclohexyl methacrylate-butyl acrylate-methacrylic acid), poly(isobornyl methacrylate-butyl acrylate-methacrylic acid), poly(styrene-butyl acrylate-methacrylic acid), poly(styrene-polyethyleneglycol methacrylate-methacrylic acid), and poly(phenyl methacrylate-polyethyleneglycol methacrylate-methacrylic acid), and preferably poly(methylmethacrylate-butylacrylate-acrylic acid), poly(styrene-butyl acrylate-methacrylic acid), and poly(phenyl methacrylate-polyethyleneglycol methacrylate-acrylic acid), and the like, and wherein the latex contains water or other suitable solvent. Prevention of heater deposits/kogation enables superior ink jetting performance and enhanced life in the printhead. The resin incorporated in the ink also enables excellent thermal stability of the ink, hence the shelf life of the ink is not at risk, for example the ink does not decompose or settle for extended time periods of up to about one year. The latex polymer, or resin is generally present in various suitable amounts, such as from about 0.10 weight percent of the 5 weight percent, the latex emulsion being comprised of polymer resin particles, surfactants, and water latex, and wherein the latex resin size n can be, for example, preferably from about 0.05 micron to about 0.5 micron in volume average diameter as measured by the Coulter N4 Plus Particle Sizer.

The colorant for the ink compositions of the present invention includes a dye, pigment, mixtures of dye and pigment, mixture of dyes, a mixture of one or more pigments, and the like. The colorant can be black, cyan, magenta, yellow, red, blue, green, orange, brown, mixtures thereof, and the like, and is preferably carbon black, such as Levanyl carbon black obtained from Bayer. Examples of suitable black pigments include various carbon blacks such as channel black, furnace black, lamp black, and the like.

Colored pigments, or dyes include red, green, blue, brown, magenta, cyan, yellow, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot CSC-440L, Cabojet 300 by Cabot corporation and other Cabot products, Bonjet Pigment products and Levanyl Black A-SF. Of these, Levanyl Black A-SF and Cabot CSX-440L are the most preferred. Examples of suitable colorants, especially pigments that may be selected in embodiments are illustrated in U.S. Pat. No. 5,556,727, the disclosure of which is totally incorporated herein by reference.

Examples of dyes include reactive dyes, direct dyes, anionic dyes, acid dyes, food dyes, and the like. Specific examples of suitable dyes include the ProJet dyes available from Zeneca (ICI) such as ProJet Yellow 1G, ProJet Yellow OAM, and ProJet Fast Yellow 2, ProJet Cyan 1, ProJet Fast Cyan 2, ProJet Magenta 3B-OA, ProJet Magenta 1T, ProJet Magenta 1, ProJet Fast Magenta 2, ProJet Fast Black 2. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon.

Preferably, the colorant, especially pigment particle size is small to enable a stable colloidal suspension of the particles in the liquid vehicle and to prevent clogging of the ink channels when the ink is used in a thermal ink jet printer. Preferred colorant particle average diameters are generally from about 0.001 to about 2 microns, and more preferably from about 0.01 to about 2 microns in volume average diameter, although the particle size can be outside these ranges. A more preferred pigment particle size includes particles having at least 70 percent of the particles being below 0.2 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

The colorant, such as pigment, is present in the ink composition in various effective amounts and generally from about 1 to about 20 percent by weight, preferably from about 2 to about 10 percent by weight, more preferably from about 2.5 to about 9 percent by weight, and most preferably from about 3 to about 8 percent, although the amount can be outside of these ranges.

Anionic surfactants include sodium dodecylsulfate (SDS), sodium dodecylbenzene sulfonate, sodium dodecyinaphthalene sulfate, dialkyl benzenealkyl, sulfates and sulfonates, abitic acid, available from Aldrich, NEOGEN R™, NEOGEN SC™ obtained from Kao, sodium lauryl sulfate or salts thereof, and the like. Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is in the range of from about 0.5 to about 4.

Examples of anionic surfactants are sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like, and examples of nonionic surfactants are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-211™, IGEPAL CA-520™, IGEPAL CA-720™, IGEPAL CQ-890™, IGEPAL CO-720™, IGEPAL CO-290™, IGEPAL CA-210™, ANTAROX 890™ and ANTAROX 897™, and hydrolyzable or cleavable nonionic surfactants of the formulas illustrated in U.S. Ser. No. 120,649, such as poly(ethylene glycol) methyl p-tert-octylphenyl phosphate, wherein the surfactant contains, for example, 40 ethylene glycol units, poly(ethylene glycol)-α-methyl ether-ω-methyl p-tert-octylphenyl phosphate (wherein the surfactant contains 17 ethylene glycol units).

Polymeric additives can also be added to the inks, for example, to enhance or modify the ink viscosity, which viscosity is measured at 25° C. using a Brookfield viscometer. Examples of additives include soluble polymers such as gum arabic, polyacrylates salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. The polymeric additives may be present in the ink of the present invention in amounts of from 0 to about 10 percent by weight, preferably from about 0.001 to about 8 percent by weight, and more preferably from about 0.01 to about 5 percent by weight, although the amount can be outside these ranges. A preferred polymeric additive is described in copending application U.S. Ser. No. 536,236, the disclosure of which are totally incorporated herein by reference, which additive is especially useful as pigment like carbon black stabilizers. The self-emulsifying sulfolated polyesters disclosed in U.S. Ser. No. 536,236, the disclosure of which are totally incorporated herein by reference, can be selected as additives in various appropriate amounts and preferably in amounts of from about 0.1 weight percent to about 12 weight percent and more preferably from about 1 weight percent to about 8 weight percent. The preferred polyesters have a glass transition temperature ranging from about 0° to about 80° C. and preferably between about 20° C. and about 65° C. One selected polyester is a sulfonated polyester with about 7.5 percent sulfonation, weight average molecular weight of about 2,080, $M_n$ of about 1,043, Tg of about 54.90° C., and softening point of about 135° C.

Examples of specific optional ink additives that may be selected include biocides, such as DOWICIL® 150, 200, and 75, benzoate salts, sorbate salts,1,2-benzisothiazolin-3-one also known as Proxel GXL products from Zeneca and the like, present in an amount of from 0 to about 10 percent by weight, preferably from about 0.001 to about 8 percent by weight, and more preferably from about 0.01 to about 4.0 percent by weight, although the amount can be outside these ranges; penetration control additives, such as N-methylpyrrolidinone, 2-pyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 1 to about 30 percent by weight, although the amount can be outside these ranges; pH controlling agents, such as acids or bases, phosphate salts, carboxylates salts, sulfite salts, amine salts, and the like, present in an amount of from 0 to about 3 percent by weight, preferably from about 0.001 to about 2 percent by weight, and more preferably from about 0.01 to about 1 percent by weight, although the amount can be outside these ranges; and penetrants, as illustrated herein, such as butyl carbitol, and cyclohexylpyrrolidinone in amounts, for example, of from about 0.1 to about 20 percent by weight and preferably from about 0.5 to about 10 percent by weight, and the like Examples of suitable ink additives include those illustrated in U.S. Pat. No. 5,223,026 and U.S. Pat. No. 5,207,825, the disclosures of each patent being totally incorporated herein by reference.

The surface tension of the colorant, such as pigment dispersions, each comprising a pigment and a polymeric dispersant, or a self dispersing pigment which does not usually require a separate polymeric dispersant to enable the pigments to be effectively dispersed in the water or solvent vehicle, is, for example, greater than about 30 dynes/cm$^2$, preferably greater than about 45 dynes/cm$^2$, and more preferably greater than about 60, such as from about 70 to about 100 dynes/cm$^2$. The ink compositions possess surface tensions of, for example, greater than about 25 dynes/cm$^2$, preferably greater than about 30 dynes/cm$^2$ and more preferably greater than about 40, such as from about 40 to about 100, dynes/cm$^2$. The viscosity of the ink composition is of, for example, less than about 10 cps, preferably less than about 8 cps, and more preferably less than about 5.0 cps, such as from about 1 to about 5 cps. The surface tension can be measured with a Kruss Model K10 tensiometer, and the viscosity can be determined at about 25° C.

The inks of the present invention possess excellent latency. Generally, the inks possess a functional latency of at least 10 seconds, more generally on the order of 20 seconds to greater than 1,000 seconds, with a minimum latency of at least about 30 seconds being preferred.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, Xerox Color Expressions, or the like, coated papers, such as those available from Jujo, transparency materials suitable for aqueous inks or ink jet printing processes, or the like.

The following Examples and Comparative Examples are provided.

EXAMPLE I

Latex:

The latex emulsion selected was comprised of 85 weight percent of high Tg monomer of methyl methacrylate (a homopolymer with a Tg of 105° C.) and acrylic acid (a homopolymer with a Tg of 106° C.), and 15 weight percent of a low Tg monomer of butyl acrylate (a homopolymer with a Tg of −55° C.). The latex polymer generated was comprised of methyl methacrylate/butyl acrylate/acrylic acid terpolymer of 75:15:10 composition using 1.5 weight percent of ammonium persulfate initiator. The latex was prepared by a batch emulsion polymerization process as follows. In a 500 millimeter jacketed glass flask with a stirrer set at 200 rpm, 1.8 grams of ammonium persulfate, 1.8 grams of sodium dodecylbenzene sulfonate, 1.8 grams of Triton X-100 (octylphenol polyether alcohol, obtained from Union Carbide), and 232 grams of deionized water were deaerated for 25 minutes. A monomer mixture of 90 grams of methyl methacrylate, 18 grams of n-butyl acrylate, and 12 grams of acrylic acid was charged into the flask and was emulsified for 10 minutes (minutes) at room temperature, about 25° C. throughout. The resulting emulsion was then polymerized at 80° C. for 5.5 hours in a nitrogen atmosphere. A latex emulsion comprised of 29.7 percent by weight of solids of poly(methyl methylacrylate-butyl methacrylate-acrylic acid) resin, 0.5 percent by weight of sodium dodecylbenzene sulfonate, 0.5 percent by weight of Triton X-100 (alkylphenoxypolyethanol), and 69.3 percent by weight water with an average particle size for the solids of 250 nanometers as measured by Coulter N4 particle size analyzer was obtained. The latex polymer possessed a glass transition temperature of 85° C. as determined by Seiko DSC, and possessed a weight average molecular weight of 449,000 as determined on a Waters GFPC.

EXAMPLE II

Ink Preparation:

5 Grams of the optional additive primarily selected for anticockling of trimethylolpropane were mixed with 21 grams of sulfolane solution at 95 weight percent and to 17.5 weight percent of deionized water. This mixture was stirred on a roll mill for about 7 minutes to enable dissolution of the trimethylolpropane. The above mixture was added dropwise through a separatory funnel into a flask comprising 25 grams of Levanyl A-SF carbon black dispersion containing 28 weight percent of carbon black, 4 weight percent of a dispersant of a naphthalene sulfuric acid condensed formaldehyde, 68 weight percent of water, and 17.5 grams of deionized water. After mixing for approximately 2 minutes, a mixture of 1.79 grams of latex from Example I (the emulsion comprised of 29.7 percent by weight of poly(methyl methylacrylate-butyl methacrylate-acrylic acid) resin, 0.5 percent by weight of sodium dodecylbenzene sulfonate, 0.5 percent by weight Triton X-100 (alkylphenoxypolyethanol), and 69.3 percent by weight water), and 12.21 grams of deionized water were added dropwise through a separatory funnel. There resulted an ink mixture comprised of 7 weight percent of carbon black, 1 weight percent of a naphthalene sulfonic acid condensed formaldehyde condensate dispersant, 20 weight percent of sulfolane, 5 weight percent of trimethylolpropane, 0.55 weight percent of (the emulsion was comprised of 29.7 percent by weight of poly(methyl methylacrylate-butyl methacrylate-acrylic acid) resin, 0.5 percent by weight of sodium dodecylbenzene sulfonate, 0.5 percent by weight of Triton X-100 (alkylphenoxypolyethanol), and 69.3 percent by weight of water) latex, and 66.45 percent of deionized water.

EXAMPLE III

Resin:

A latex emulsion comprised of 79 weight percent of high, 110° C., Tg monomers of phenyl methacrylate (homopolymer with a Tg of 110° C.) and acrylic acid (homopolymer with a Tg of 106° C.), and 21 weight percent of a low, minus (−) 24° C., Tg monomer of polyethyleneglycol methacrylate (homopolymer with a Tg of −24° C.). A latex resulted that was derived from phenyl methacrylate/polyethyleneglycol methacrylate/acrylic acid terpolymer of 55:21:24 composition. The latex was prepared by a batch emulsion polymerization process. In a 1 liter kettle equipped with a mechanical stirrer was charged with 240 grams of water, 18 grams of sodium dodecyl benzene sulfonate obtained from Rhone-Poulenc as Rhodacal DS-10, and 2 grams of Triton X-100 (alkylphenoxypolyethenol) available from Aldrich Chemicals, and this mixture was stirred for 2 hours at about 100 revolutions per minute. To this solution were then added 1.8 grams of ammonium persulfate followed by the addition of an organic mixture containing 28.3 grams of acrylic acid, 66.5 grams of phenyl methacrylate, 25.2 grams of polyethyleneglycol methacrylate with a molecular weight of 246 grams per mole, 3.6 grams of dodecanethiol and 1.2 grams of carbon tetrabromide. The mixture was then heated to 80° C. for duration of 6 hours. The latex was then cooled to room temperature, and a sample (about 10 grams) was freeze dried and analyzed by GPC, and which sample had a weight average molecular weight of about 20,580, and a number average molecular weight of about 8,193. A latex emulsion comprised of 34 weight percent of poly(phenyl methacrylate/polyethyleneglycol methacrylate/acrylic acid) resin, 0.5 weight percent of sodium dodecylbenzene sulfonate, 0.5 percent by weight of Triton X-100 (alkylphenoxypolyethanol), and 65 percent by weight of water, with an average particle latex particle size of 300 nanometers as measured by Coulter N4 particle size analyzer was obtained. The latex polymer possessed a glass transition temperature of 55° C. as determined by Seiko DSC.

EXAMPLE IV

Ink Preparation:

0.05 Gram of polyethyleneoxide ($M_w$=8,000 grams/mole) (obtained from Polysciences), 31.52 grams of sulfolane solution at 95 weight percent, was added to 38.49 grams of deionized water, and 1 gram of the smearing additive polyether-polymethyl-siloxane copolymer (obtained from Goldschmidt named Tegopren 5884). 6 Grams of 2-pyrrolidinone obtained from Aldrich were then added to the above mixture with 1.94 grams of the latex Example II above (emulsion comprised of 34 weight percent of poly (phenyl methacrylate/polyethyleneglycol methacrylate/ acrylic acid) resin, 0.5 weight percent of sodium dodecyl-benzene sulfonate, 0.5 percent by weight of Triton X-100 (alkylphenoxypolyethanol), and 65 percent by weight of water). This mixture was stirred on a roll mill for about 10 minutes to enable dissolution of the solids. The above mixture was added dropwise through a separatory funnel to another flask containing 21 grams of Cabot carbon black dispersion (Cabojet 300), contained 15 weight percent of carbon black and 85 weight percent of water. The resulting ink mixture was comprised of 3.15 weight percent of carbon black, 29.95 weight percent of Sulfolane, 6 weight percent of 2-pyrrolidinone, 1 weight percent of polyether-polymethyl-siloxane copolymer and 0.68 weight percent (emulsion comprised of 34 weight percent poly(phenyl methacrylate/polyethyleneglycol methacrylate/acrylic acid) of resin, 0.5 weight percent of sodium dodecylbenzene sulfonate, 0.5 percent by weight of Triton X-100 (alkylphenoxypolyethanol), and 65 percent by weight of water) of latex, and 59.22 weight percent was deionized water.

COMPARATIVE EXAMPLE 1

Resin:

There was prepared a latex emulsion generated from a mixture of 55 weight percent of high Tg monomers of methylmethacrylate, 10 weight percent of acrylic acid, and 45 weight percent of a low Tg monomer of butyl acrylate resulting in a methyl methacrylate/butyl acrylate/acrylic acid terpolymer after polymerization. The latex was prepared by a batch emulsion polymerization process as follows. In a 500 millimeter jacketed glass flask with a stirrer set at 200 rpm, 1.8 grams of ammonium persulfate, 1.8 grams of sodium dodecylbenzene sulfonate, 1.8 grams of Triton X-100 (octylphenol polyether alcohol, available from Union Carbide), and 232 grams of deionized water was deaerated for 25 minutes. A monomer mixture of 54 grams of methyl methacrylate, 54 grams of n-butyl acrylate, and 12 grams of acrylic acid was charged into the flask and the resulting mixture was emulsified for 10 minutes at room temperature, about 25° C. throughout. The emulsion was then polymerized at 80° C. for 5.5 hours in a nitrogen atmosphere. There was obtained latex emulsion comprised of 33.6 weight percent of poly(methyl methacrylate/butyl acrylate/acrylic acid) resin, 0.5 weight percent of sodium dodecylbenzene sulfonate, 0.5 percent by weight of Triton X-100 (alkylphenoxypolyethanol), and 65.4 percent by weight of water with an average particle size of 258 nanometers as measured by Coulter N4 particle size analyzer. The latex possessed a glass transition temperature of 24° C. (degrees Centigrade throughout) as determined by Seiko DSC and possessed a weight average molecular weight of 661,000, as determined on a Waters GPC.

COMPARATIVE EXAMPLE 2

Ink Preparation:

5 Grams of trimethylolpropane were mixed with 21 grams of sulfolane solution at 95 weight percent (5 weight percent of water, 95 weight percent of sulfolane), and 17.5 weight percent of deionized water. This mixture was stirred on a roll mill for about 7 minutes to enable dissolution of the trimethylolpropane. The above mixture was added dropwise through a separatory funnel to another flask containing 25 grams of Levanyl A-SF carbon black dispersion (containing 28 weight percent of carbon black, 4 weight percent of the dispersant naphthalene sulfuric acid condensed formaldehyde condensate and 68 weight percent of water) 17.5 grams of deionized water. To this, a mixture of 1.59 grams of latex from Comparative Example 1 (emulsion comprised of 34 weight percent poly(methyl methacrylate-butylacrylate-acrylic acid) resin, 0.5 weight percent of sodium dodecyl-benzene sulfonate, 0.5 percent by weight of Triton X-100 (alkylphenoxypolyethanol), and 65 percent by weight water), and 12.41 grams of deionized water was added dropwise through a separatory funnel. The resulting ink mixture was comprised of 7 weight percent of carbon black, 1 weight percent of dispersant, 20 weight percent of sulfolane, 5 weight percent of trimethylolpropane, 0.55 weight percent of latex, of 29.7 weight percent of poly) methyl methacrylate/butyl methacrylate/acrylic acid) resin, 0.5 weight percent of sodium dodecyl-benzene sulfonate, 0.5 weight percent of Triton X-100 in alkylphenoxy polyethanol, and 69.3 weight percent of water; and 66.45 was deionized water.

COMPARATIVE EXAMPLE 3

Resin:

A latex emulsion was prepared by essentially repeating Comparative Example 1 as follows. In a 500 millimeter jacketed glass flask with a stirrer set at 200 rpm, 0.9 gram of ammonium persulfate, 1.8 grams of sodium dodecylbenzene sulfonate, 1.8 grams of Triton X-100 (octylphenol polyether alcohol, available from Union Carbide), and 232 grams of deionized water were deaerated for 25 minutes. A monomer mixture of 54 grams of methyl methacrylate, 54 grams of n-butyl acrylate, and 12 grams of acrylic acid was charged into the flask and the resulting mixture was emulsified for 10 minutes at room temperature. The emulsion was then polymerized at 80° C. for 5.5 hours in a nitrogen atmosphere. A latex emulsion comprised of 32.8 weight percent of poly (methyl methacrylate/butyl acrylate/acrylic acid) resin, 0.5 weight percent of sodium dodecylbenzene sulfonate, 0.5 percent by weight of Triton X-100 (alkylphenoxypolyethanol), and 66.2 percent by weight of water with an average particle latex size of 170 nanometers as measured by Coulter N4 particle size analyzer was obtained. The latex had a glass transition temperature of 29° C. as determined by Seiko DSC, and possessed a weight average molecular weight of 1,095,000, as determined on a Waters GPC.

COMPARATIVE EXAMPLE 4

Ink Preparation:

5 Grams of trimethylolpropane were mixed with 21 grams of sulfolane solution at 95 weight percent, and 17.5 weight percent of deionized water. This mixture was stirred on a roll mill for about 7 minutes to enable dissolution of the trimethylolpropane. The above mixture was added dropwise through a separatory funnel to another flask containing 25 grams of Levanyl A-SF Carbon Black dispersion (containing 28 weight percent of carbon black, 4 weight percent of the dispersant and 68 weight percent of water) that was centrifuged at contained 28 weight percent of carbon black, 17.5 grams of deionized water. To the above mixture, a mixture of 1.63 grams of latex from Comparative Example 2 (emulsion comprised of 33.8 weight percent poly(methyl methacrylate-butylacrylate-acrylic acid) resin, 0.5 weight percent of sodium dodecylbenzene sulfonate, 0.5 percent by weight Triton X-100 (alkylphenoxypolyethanol), and 65.2 percent by weight water) and 12.37 grams of deionized water was then added dropwise through a separatory funnel. The resulting ink mixture was composed of 7 weight percent of carbon black, 1 weight percent of the dispersant, 20 weight percent of sulfolane, 5 weight percent of trimethylolpropane, 0.55 weight percent of latex, and 66.45 was deionized water.

Procedure for Identifying Kogation:

To monitor the kogation behavior, droplets of ink were added to an open faced heater and electrical current was applied to generate bubble formation. The pulsing was run to 2×10^6 pulses at 38 Volts at 2KHz. The heater was then removed and examined underneath a microscope for heater deposit examination. In addition, the heater was rinsed with DI water and reexamined to observe if particulates were removed. This helps to identify the severity of the depositions on the heaters. Reported is the before rinsing process. Having the heaters covered with debris, an early sign of kogation, since the number of pulses is fairly small compared to the expected life of the heaters in a printer machine. When heaters are covered with debris, they insulate the heaters, hence less energy is available for formation of the ink bubble to generate the appropriate drop size. To the consumer, the image printed over time would decrease in optical density and produce streaky prints, with the additional failure of the heaters.

Thermal stability is also important for pigmented ink systems. Heat treatment at 60° C. for 24 hours provides an indication if the ink is sufficiently stable. Monitoring of physical properties is one tool for assessing the aforementioned ink stability. Deviations of 0.3 or greater in viscosity can be disadvantageous as the ink properties in the printhead would change and cause nonuniformity in the ink drops on printed paper. Also, the ink may not function as desired if the thermal stability is compromised, for example ejection efficiency and optical density would be decreased and phase separation of the ink would occur at the front face of the printhead.

Results:

TABLE

All Properties Measured at 25° C.

| Ink ID | Tg of Latex used ° C. | Viscosity Cps | Surface Tension D/cm | PH | Optical density LX | Heater Deposits Rating <3 is Excellent >3 is poor |
|---|---|---|---|---|---|---|
| Example I 25° C. | 85 | 2.51 | 51.2 | 5.03 | 1.33 | 1 |
| After heat treatment 60° C./24 hour | 85 | 2.53 | 52.4 | 4.90 | 1.33 | 1 |
| Example II | 55 | 2.64 | 32.0 | 7.02 | 1.63 | 2 |
| After heat treatment 60° C./24 hour | 55 | 2.62 | 31.8 | 7.00 | 1.62 | 2 |
| Comparative 1 | 24 | 2.50 | 52.1 | 5.19 | 1.33 | 7 |
| After heat treatment 60° C./24 hour | 24 | 2.56 | 52.5 | 5.16 | 1.30 | 8 |
| Comparative | 29 | 2.75 | 52.6 | 5.38 | 1.36 | 7 |
| After heat treatment 60° C./24 hour | 29 | 3.13 | 52.8 | 5.30 | 1.27 | 7 |

Rating:
1 = about 0 to 0.5% coverage of deposits on the heaters.
2 = about 0.05 to 5% coverage of deposits on the heaters.
7 = about 90% coverage of deposits on the heaters.
8 = about 95% coverage of deposits and thicker layer of deposits on the heaters.

From the above Table, the two Examples with a polymer additive with a high glass transition temperature evidenced excellent thermal stability with no change in viscosity. The rating for 1 and 2 indicate that essentially no heater deposits were visually seen on the heaters after the kogation procedure was performed. The use of a higher glass transition resin combined with the appropriate colorant, or carbon black dispersion provided excellent interaction in the ink mixture, hence no agglomeration to the heaters upon firing the heaters. In the Comparative Examples, the resins with low glass transition temperatures agglomerated upon heating with the carbon black dispersion causing excessive heater deposits and insulating the heaters. The grading of a 7 indicates heavy ink deposits, and when this occurs, the firing frequency decreases, and the efficiency of the voltage applied is reduced significantly, resulting in poor jetting and streaky prints from the printhead, and lower optical density.

Other modifications of the present invention may occur to those skilled in the art subsequent to a review of the present application and these modifications, including equivalents thereof, are intended to be included within the scope of the present invention.

What is claimed is:

1. A process for the preparation of an ink jet ink comprised of an organic solvent, a colorant and a latex, and wherein the latex is generated from the polymerization of a mixture of an anionic surfactant, a nonionic surfactant, and a mixture of olefinic monomers, followed by the addition of an organic solvent.

2. A process in accordance with claim 1 wherein the mixture of monomers is comprised of two monomers.

3. A process in accordance with claim 1 wherein the mixture of monomers is comprised of two monomers of a first monomer and a second monomer, and wherein the first monomer possesses a glass transition temperature of equal to about, or higher than about 70° C.

4. A process in accordance with claim 1 wherein the mixture of monomers is comprised of two monomers containing a first monomer and a second monomer, and wherein the first monomer when polymerized produces a homopolymer that possesses a glass transition temperature of about 90° C. to about 120° C.

5. A process in accordance with claim 1 wherein the mixture of monomers is comprised of two monomers containing a first monomer and a second monomer, and wherein the first monomer when polymerized produces a homopolymer that possesses a glass transition temperature of about 100° C. to about 110° C.

6. A process in accordance with claim 1 wherein the mixture of monomers is comprised of two monomers of a first monomer and a second monomer, and wherein the second monomer possesses a glass transition temperature of equal to about, or lower than about 20° C.

7. A process in accordance with claim 1 wherein the mixture of monomers is comprised of two monomers of a first monomer and a second monomer, and wherein the second monomer possesses a glass transition temperature of from about 0° C. to about minus (−) 60° C.

8. A process in accordance with claim 1 wherein the mixture of monomers is comprised of two monomers of a first monomer and a second monomer, and wherein the second monomer possesses a glass transition temperature of from about a minus (−) 10° C. to about −30° C.

9. A process in accordance with claim 1 wherein the mixture of monomers is comprised of two monomers of a first monomer and a second monomer, and wherein the second monomer is a homopolymer that possesses a glass transition temperature of from about 0° C. to about −60° C.

10. A process in accordance with claim 1 wherein the mixture of monomers is comprised of two monomers of a first monomer and a second monomer, and wherein the first monomer possesses a higher glass transition temperature than the second monomer.

11. A process in accordance with claim 1 wherein the mixture of monomers is comprised of two monomers of a first monomer and a second monomer, and wherein the first monomer possesses a higher glass transition temperature than the second monomer, and wherein each of said first and said second monomer is a homopolymer.

12. A process in accordance with claim 1 wherein the mixture of monomers is comprised of two monomers of a first monomer and a second monomer, and wherein the first monomer possesses a higher glass transition temperature than the second monomer, and wherein the amount of said first monomer selected is from about 60 to about 98 weight percent and wherein the total of said two monomers is about 100 percent.

13. A process in accordance with claim 1 wherein the mixture of monomers is comprised of two monomers of a first monomer and a second monomer, and wherein the first monomer possesses a higher glass transition temperature than the second monomer, and wherein the amount of said first monomer selected is from about 70 to about 95 weight percent and wherein the total of said two monomers is about 100 percent.

14. A process in accordance with claim 1 wherein the mixture of monomers is comprised of two monomers of a first monomer and a second monomer, and wherein the first monomer possesses a higher glass transition temperature than the second monomer, and wherein the amount of said second monomer selected is from about 2 to about 40 weight percent and wherein the total of said two monomers is about 100 percent.

15. A process in accordance with claim 1 wherein the mixture of monomers is comprised of two monomers of a first monomer and a second monomer, and wherein the first monomer possesses a higher glass transition temperature than the second monomer, and wherein the amount of said second monomer selected is from about 5 to about 30 weight percent and wherein the total of said two monomers is about 100 percent.

16. A process in accordance with claim 1 wherein the mixture of monomers is comprised of two monomers of a first monomer and a second monomer, and wherein the first monomer possesses a higher glass transition temperature than the second monomer, and wherein the amount of said first monomer selected is from about 60 to about 98 weight percent, the amount of said second monomer is from about 2 to about 40 weight percent and wherein the total of said two monomers is about 100 percent.

17. A process in accordance with claim 16 wherein said first monomer possesses a glass transition temperature of from about 90° C. to about 120° C.

18. A process in accordance with claim 16 wherein said second monomer possesses a glass transition temperature of from about 2° C. to about 40° C.

19. A process in accordance with claim 16 wherein said first monomer possesses a glass transition temperature of from about 90° C. to about 120° C., and wherein said second monomer possesses a glass transition temperature of from about 2° C. to about 40° C.

20. A process in accordance with claim 1 wherein the mixture of monomers is comprised of two monomers of a first monomer and a second monomer, and wherein the first monomer possesses a higher glass transition temperature than the second monomer, and wherein said first monomer possesses a glass transition temperature of from 90° C. to about 120° C., said second monomer possesses a glass transition temperature of form about 0° C. to about −60° C., and wherein said first monomer is selected in an amount of from about 60 to about 98 percent by weight, and said second monomer is present in an amount of from about 2 to about 40 percent by weight and wherein the total amount of said first and said second monomer is about 100 percent.

21. A process in accordance with claim 1 wherein said mixing of colorant and latex provides a homogeneous mixture.

22. A process in accordance with claim 1 wherein said colorant is a colorant dispersion comprised of a colorant and a dispersant or a self-dispersing colorant.

23. A process in accordance with claim 1 wherein said mixture is comprised of a first monomer and a second monomer, and wherein said first monomer is selected from a group consisting of methyl methacrylate, cyclohexyl methacrylate, phenyl methacrylate, isobornyl methacrylate, acrylic acid, methacrylic acid, and styrene.

24. A process in accordance with claim 1 wherein said mixture is comprised of a first monomer and a second monomer, and wherein said second monomer is selected from a group consisting ethyl acrylate, butyl acrylate, hexyl acrylate, polyoxyethylene acrylate and methacrylate.

25. A process in accordance with claim 1 wherein the colorant is a dye.

26. A process in accordance with claim 1 wherein the colorant is a pigment.

27. A process in accordance with claim 1 wherein said colorant possesses a particle size distribution wherein at least about 90 percent of said colorant particles have a diameter of about 0.1 $\mu$m with the remaining colorant particles being of a diameter of about 1 $\mu$m.

28. A process in accordance with claim 1 wherein the latex contains water.

29. A process in accordance with claim 1 wherein the amount of monomer selected is from about 90 to about 99, the amount of anionic surfactant is from about 0.1 to about 10, and the amount of nonionic surfactant is from about 0.1 to about 6 weight percent based on the total weight percent amount of monomer, ionic surfactant, and nonionic surfactant.

30. A process in accordance with claim 1 wherein there is obtained an ink and there is added to said ink an ink vehicle and ink additives.

31. A process in accordance with claim 30 wherein the vehicle is water, a glycol, or a mixture of glycols.

32. A process in accordance with claim 30 wherein said additives are surfactants of poly(ethylene glycol) monolaurate, poly(ethylene glycol) monoricinoleate, poly (ethylene glycol) lanolin alcohol ether, poly(ethylene glycol) monooleate, poly(ethylene glycol) castor oil, poly (ethylene glycol) tetramethyl decynediol, or poly(ethylene glycol) lanolin, and which surfactants are present in an amount of from about 0.01 to about 7 weight percent or parts based on the total ink components.

33. A process in accordance with claim 30 wherein said additives are comprised of a biocide, a humectant, or mixtures thereof.

34. A high resolution printing process comprising applying in imagewise fashion to a substrate an ink composition obtained by the process of claim 1.

35. A process in accordance with claim 34 wherein the substrate is paper, and there is selected a printer having at least one nozzle of a channel width or diameter ranging from about 10 to about 40 microns and intercolor bleed is minimized or eliminated, and wherein said printing process is optionally accomplished with a 600 spi ink jet printer with a radiant heat assisting drying process.

36. A process in accordance with claim 1 wherein subsequent to polymerization there is formed a polymer selected from the group consisting of poly(methyl methacrylate-butyl acrylate), poly(phenyl methacrylate-butyl acrylate), poly(styrene-butyl acrylate), poly(styrene-polyethyleneglycol methacrylate), poly(phenyl methacrylate-polyethylene glycol methacrylate), poly(methyl methacrylate-butyl acrylate-acrylic acid), poly(methyl methacrylate-hexyl acrylate-acrylic acid), poly(cyclohexyl methacrylate-butyl acrylate-acrylic acid), poly(styrene-butyl acrylate-acrylic acid), poly(styrene-polyethyleneglycol methacrylate-acrylic acid), poly(phenyl methacrylate-polyethyleneglycol methacrylate-acrylic acid), poly(methyl methacrylate-butyl acrylate-methacrylic acid), poly(methyl methacrylate-hexyl acrylate-methacrylic acid), poly(phenyl methacrylate-butyl acrylate-methacrylic acid), poly(cyclohexyl methacrylate-butyl acrylate-methacrylic acid), poly(isobornyl methacrylate-butyl acrylate-methacrylic acid), poly(styrene-butyl acrylate-methacrylic acid), poly(styrene-polyethyleneglycol methacrylate-methacrylic acid), and poly(phenyl methacrylate-polyethylene glycol methacrylate-methacrylic acid), and preferably poly(methyl methacrylate-butylacrylate-acrylic acid), poly(styrene-butyl acrylate-methacrylic acid), and poly(phenyl methacrylate-polyethyleneglycol methacrylate-acrylic acid).

37. A process in accordance with claim 1 wherein said organic solvent is a glycol, a diol, a sulfoxide, an amide, an ether, an alcohol, a ketone, or an amino alcohol.

38. A process in accordance with claim 1 wherein said organic solvent is sulfolane, diethylene glycol, 2-pyrrolidinone, N-methyl pyrrolidinone, butyl carbitol, formamide, glycerin, or mixtures thereof.

39. A process in accordance with claim 1 wherein said organic solvent is selected in an amount of from about 5 to about 50 weight percent.

40. A process in accordance with claim 1 wherein said organic solvent primarily functions as a humectant.

41. A process in accordance with claim 1 wherein said polymerization is accomplished by heating at a temperature of from about 45° C. to about 90° C.

42. A process in accordance with claim 1 wherein there is generated a polymer of poly(methylmethacrylate-butylacrylate-acrylic acid), poly(styrene-butyl acrylate-methacrylic acid), and poly(phenyl methacrylate-polyethyleneglycol methacrylate-acrylic acid).

43. A process in accordance with claim 1 wherein there is generated a polymer of the latex polymer which possesses a number average molecular weight $M_n$ of from about 1,000 to about 1,000,000, a weight average molecular weight $M_w$ of from about 5,000 to about 2,000,000.

44. A process in accordance with claim 43 wherein the latex polymer possesses an average molecular weight $M_w$ of from about 3,000 to about 500,000 grams per mole.

45. A process in accordance with claim 43 wherein the polymer of the latex possesses a number average molecular weight of from about 8,000 to about 1,500,000 grams per mole.

46. A process in accordance with claim 1 wherein said anionic surfactant is sodium dodecyl sulfate, sodium dodecylbenzene sulfonate, sodium dodecyl naphthalene sulfate, sodium dodecyl diphenyloxide disulfonate, or sodium N-decyl diphenyloxide disulfonate, wherein the anionic surfactant is selected in an amount of from about 0.1 to about 10 weight percent based on the total weight percent amount of monomer, ionic surfactant, and nonionic surfactant used to prepare the latex emulsion.

47. A process in accordance with claim 1 wherein said nonionic surfactant is polyvinyl alcohol, polyacrylic acid, methyl cellulose, polyoxyethylene octylphenyl ether, or polyoxyethylene nonylphenyl ether, wherein the nonionic surfactant is selected in an amount of from about 0.1 to about 6 weight percent based on the total weight percent amount of monomer, ionic surfactant, and nonionic surfactant used to prepare the latex emulsion.

48. A process in accordance with claim 1 wherein said organic solvent is sulfolane, 2-pyrrolidinone, ethylene glycol, diethylene glycol, dipropylene glycolmonomethyl ether, N-pyrrolidinone, or mixtures thereof.

49. A process for the preparation of an ink jet ink which comprises mixing a colorant and a latex, and wherein the latex is generated from the polymerization of a mixture of an anionic surfactant, a nonionic surfactant, and a mixture of olefinic monomers.

50. A process in accordance with claim 49 wherein said mixture of olefinic monomers is comprised of two monomers, and subsequent to polymerization there is added an organic solvent.

51. A process in accordance with claim 49 wherein said mixture is comprised of a first monomer with a high glass transition temperature and the second monomer is comprised of a low glass transition temperature monomer, and subsequent to polymerization there is added an organic solvent.

52. A process for the preparation of an ink jet ink consisting essentially of an organic solvent, a colorant and a latex, and wherein the latex is generated from the polymerization of a mixture of an anionic surfactant, a nonionic surfactant, and a mixture of olefinic monomers, followed by the addition of an organic solvent.

* * * * *